(12) United States Patent
Jeong

(10) Patent No.: US 6,829,202 B2
(45) Date of Patent: Dec. 7, 2004

(54) OPTICAL PICK-UP ACTUATOR

(75) Inventor: Ho-Seop Jeong, Sungnam-si (KR)

(73) Assignee: Samsung Electro-Mechanics Co., Ltd., Kyunggi-Do (KR)

( * ) Notice: Subject to any disclaimer, the term of this patent is extended or adjusted under 35 U.S.C. 154(b) by 554 days.

(21) Appl. No.: 09/991,701

(22) Filed: Nov. 26, 2001

(65) Prior Publication Data

US 2003/0043707 A1 Mar. 6, 2003

(30) Foreign Application Priority Data

Aug. 28, 2001 (KR) ........................................ 2001-52160

(51) Int. Cl.[7] ................................................ G11B 7/09
(52) U.S. Cl. ................................ 369/44.15; 369/44.16; 369/44.32
(58) Field of Search ........................... 369/44.14, 44.15, 369/44.16, 44.22, 44.32, 53.19

(56) References Cited

U.S. PATENT DOCUMENTS

| | | | | |
|---|---|---|---|---|
| 5,008,873 A | * | 4/1991 | Tanaka et al. | 369/44.15 |
| 5,956,188 A | * | 9/1999 | Lee | 369/44.14 |
| 6,295,255 B1 | * | 9/2001 | Seo et al. | 369/44.32 |
| 6,483,798 B1 | * | 11/2002 | Wu | 369/219 |
| 6,574,052 B2 | * | 6/2003 | Suh | 369/44.22 |

FOREIGN PATENT DOCUMENTS

| | | | |
|---|---|---|---|
| JP | 62231433 A | * | 10/1987 |
| JP | 05120696 A | * | 5/1993 |

* cited by examiner

Primary Examiner—Thang V. Tran
(74) Attorney, Agent, or Firm—Morgan, Lewis & Bockius LLP

(57) ABSTRACT

An optical pick-up actuator for optical pick-up devices is disclosed. In the actuator of this invention, the blade positioned to float above a yoke plate has one focusing coil, two tracking coils and two tilting magnets. The yoke plate has two side yokes holding two tilting coils at positions vertically aligned with the two tilting magnets. The tilting magnets are formed on the lower surface of the blade at positions, which are symmetrical around the perpendicular optical path of an object lens of the blade or around the tilting axis of the blade. The tilting magnets of the blade and the tilting coils of the yoke plate are operated under the control of a solenoid. When a current flows in the tilting coils, the tilting magnets generate electromagnetic fields to tilt the blade at a desired angle relative to the perpendicular optical path of the object lens. The pick-up actuator thus stably performs a blade tilting operation in addition to performing conventional focusing and tracking operation, and so the actuator allows the object lens to precisely focus a laser beam on a disc, particularly, a high density optical DVD, and allows an optical pick-up device to precisely read or write information from or onto the disc even when the disc is inclinedly positioned in the deck of a disc player.

5 Claims, 5 Drawing Sheets

OPTICAL PICK-UP ACTUATOR

BACKGROUND OF THE INVENTION

1. Field of the Invention

The present invention relates, in general, to optical pick-up actuators for focusing and tracking the object lens of an optical pick-up device relative to a disc while reading or writing information from or onto the disc and, more particularly, to an optical pick-up actuator having a blade, which is installed to float above a yoke plate and be tiltable relative to the yoke plate, thus allowing the pick-up device to precisely read or write information from or onto a high density disc even when the disc is inclinedly positioned in the deck of a disc player.

2. Description of the Prior Art

As well known to those skilled in the art, an optical pick-up actuator is an actuating element of an optical pick-up device, which moves the object lens of the pick-up device in a radial direction to find a desired track of a disc and moves the lens in an axial direction to adjust the size of a focused beam spot on the disc as desired, thus adjusting the optical spot of a laser beam in case of occurrence of an axial positioning error and/or a radial positioning error of the laser beam spot formed on a recording pit of the disc by the laser beam radiated from a laser diode of the pick-up device through the object lens.

Of conventional optical pick-up actuators having a lens drive mechanism, an optical pick-up actuator used in DVD players has been required to have a high drive precision in accordance with the recent trend of an increase in the density of recording pits formed on the tracks of a disc.

That is, the blade of such an optical pick-up actuator, designed to appropriately focus a laser beam on a disc using its object lens under the drive of the actuator's drive mechanism, is provided with a magnet for forming a magnetic flux. Due to the magnetic flux from the magnet, the blade having the object lens is electromagnetically moved in a vertical direction relative to a yoke plate by means of a focusing coil, moved in a radial direction by means of a tracking coil, and tilted in accordance with an angle of inclination of a disc installed within a disc player.

FIG. 1 shows the construction of a conventional wire-driven optical pick-up actuator. As shown in the drawing, a lens holder 140 or a so-called "blade", fixedly holding an object lens 142, is supported on a yoke plate 110 by a plurality of suspension wires 130 such that the blade 140 is movable on the yoke plate 110. The object lens 142 is set in the center of the blade 140, while a focusing coil 144 is horizontally wound around the blade 140. Two tracking coils 146, each having a rectangularly coiled structure, are attached to opposite sides of the focusing coil 144.

Two coil PCBs 148 are mounted to opposite sides of the blade 140 while being angularly spaced apart from the two tracking coils 146 at right angles, thus connecting the tracking coils 146 to the focusing coil 144. Two symmetrical external yokes 114 are formed on the yoke plate 110, while a magnet 118 is mounted to each external yoke 114 through a bonding process. The two magnets 118 apply magnetic fluxes to both the focusing coil 144 and the two tracking coils 146, thus generating electromagnetic force in the actuator. Two symmetrical internal yokes 112 are formed on the yoke plate 110 such that the two internal yokes 112 extend upward from the yoke plate 110 at positions spaced apart from the external yokes 114 by a predetermined gap, thus guiding the flow of magnetic fluxes from the magnets 118 in the actuator. Therefore, the above optical pick-up actuator forms a closed magnetic circuit, in which the magnetic fluxes from the magnets 118 strongly pass through the coils 146 and 144 in a horizontal direction, and pass along the planar surfaces of both the internal yokes 112 and the yoke plate 110 prior to being returned to the magnets 118.

A second yoke 116 is provided at a side edge of the yoke plate 110 for supporting both a wire holder 120 and a suspension PCB 122 using a plurality of setscrews. The first end of each suspension wire 130 is connected to an associated coil PCB 148 of the blade 140, while the second end of each wire 130 is connected to the wire holder 120. The blade 140 thus floats on the yoke plate 110 by means of the suspension wires 130. In an operation of the optical pick-up actuator, a current applied from a signal processing unit to the suspension PCB 122 is also applied to both the tracking coils 146 and the focusing coil 144 through the suspension wires 130.

In order to horizontally move the blade 140 of such an optical pick-up actuator on the deck of a CD player or a DVD player, the yoke plate 110 is locked to a pick-up base (not shown), which is installed on the deck so as to be movable on the deck. The optical pick-up actuator moves the object lens relative to a disc as required during a data reading or recording operation of the pick-up device.

However, the wire-driven optical pick-up actuator, operated by both the tracking coils and the focusing coil, is problematic as follows, particularly when the actuator is used with a DVD player for playing an optical disc having densely packed recording pits. That is, the movable range of the blade of such an actuator is determined by both the tracking coils and the focusing coil, and so it is very difficult for a pickup device with such an actuator to write information on an optical disc.

In other words, it is almost impossible for the conventional wire-driven pick-up actuator to tilt the object lens when it is desired to precisely align the optical path of the lens with a disc in the case of the disc inclinedly seated in a disc player. In an effort to overcome such a problem of the conventional wire-driven actuators, another drive mechanism for optical pick-up actuators used in CD players has been proposed. This drive mechanism has an improved blade structure and six or more suspension wires, and controls the blade tilting, direction in response to a current direction flowing through the suspension wires. However, this actuator structure is problematic in that it has a complex construction, thus complicating the operational precision test process for the actuators and deteriorating the operational reliability of the pick-up actuators.

The blade tilting operation of the optical pick-up actuator is performed to align the optical path of an object lens with a disc when the disc is driven in a disc player while being inclined. Particularly, it is necessary for an optical pick-up actuator to perform such a blade tilting operation when it is used with a disc having a high recording density or densely packed recording pits.

In recent years, a magnet-driven pick-up actuator, designed to perform such a blade tilting operation in addition to performing a vertical and radial movement of the blade relative to a yoke plate, has been proposed and preferably used in accordance with the use of high capacity optical discs or high density recording discs. In a conventional magnet-driven pick-up actuator, a blade, installed above a yoke plate and having a focusing coil, two tracking coils and an object lens, is also provided with a drive magnet for controlling the vertical movement, radial movement and tilting action of the blade relative to the yoke plate in accordance with a current-induced magnetic field of each of the focusing and tracking coils. However, such a conventional magnet-driven pick-up actuator is problematic in that it is reduced in its operational performance since its magnetic circuit does not form any closed loop, but has a large void.

SUMMARY OF THE INVENTION

Accordingly, the present invention has been made keeping in mind the above problems occurring in the prior art, and an object of the present invention is to provide an optical pickup actuator, which is used for focusing and tracking its object lens relative to a disc while reading or writing information from or onto the disc, and the blade of which is installed to float above a yoke plate and be effectively tiltable relative to the yoke plate, thus allowing the object lens to be aligned with a high density disc and allowing an optical pick-up device to precisely read or write information from or onto the disc even when the disc is inclinedly positioned in the deck of a disc player.

In order to accomplish the above objects, the present invention provides an optical pick-up actuator, comprising: a blade having an object lens at its top center for focusing light, the blade also having a drive coil unit around its outside surface and a plurality of magnet seating holes on opposite sides of its lower surface; a tilting magnet held in each of the magnet seating holes of the blade; a plurality of suspension wires allowing a current to flow therethrough and supporting the blade; a wire holder supporting one end of each of the suspension wires; a side yoke provided at a position vertically aligned with each of the tilting magnets held in the magnet seating holes of the blade; a tilting coil held on the side yoke and electromagnetically tilting the blade at a desired angle relative to the perpendicular optical path of the object lens; a drive magnet forming a magnetic field in the drive coil unit of the blade; internal and external yokes holding the drive magnet and determining the range of the magnetic field formed in the drive coil unit, the internal and external yokes being integrated into a single structure; and a yoke plate having a beam passing hole at its central area aligned with the optical path of the object lens, thus allowing a light beam from the object lens to pass through, the yoke plate also holding the wire holder thereon.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
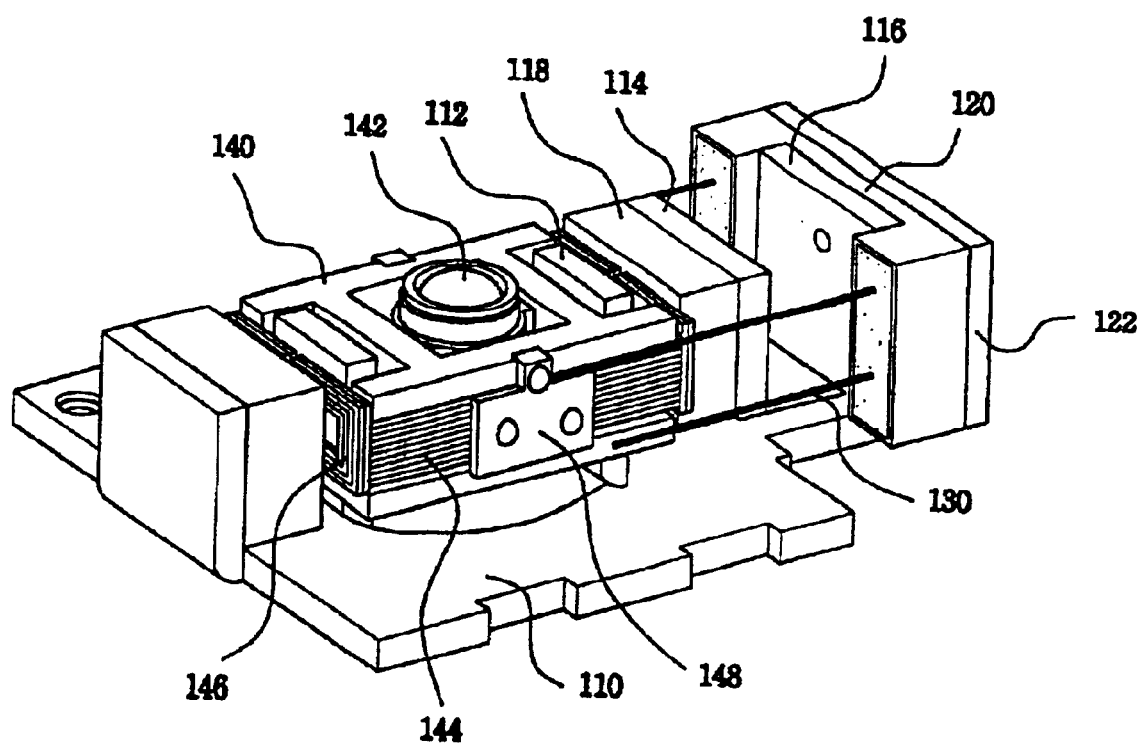
FIG. 1 is a perspective view of a conventional optical pick-up actuator.

Reference now should be made to the drawings, in which the same reference numerals are used throughout the different drawings to designate the same or similar components.

Figure 2:
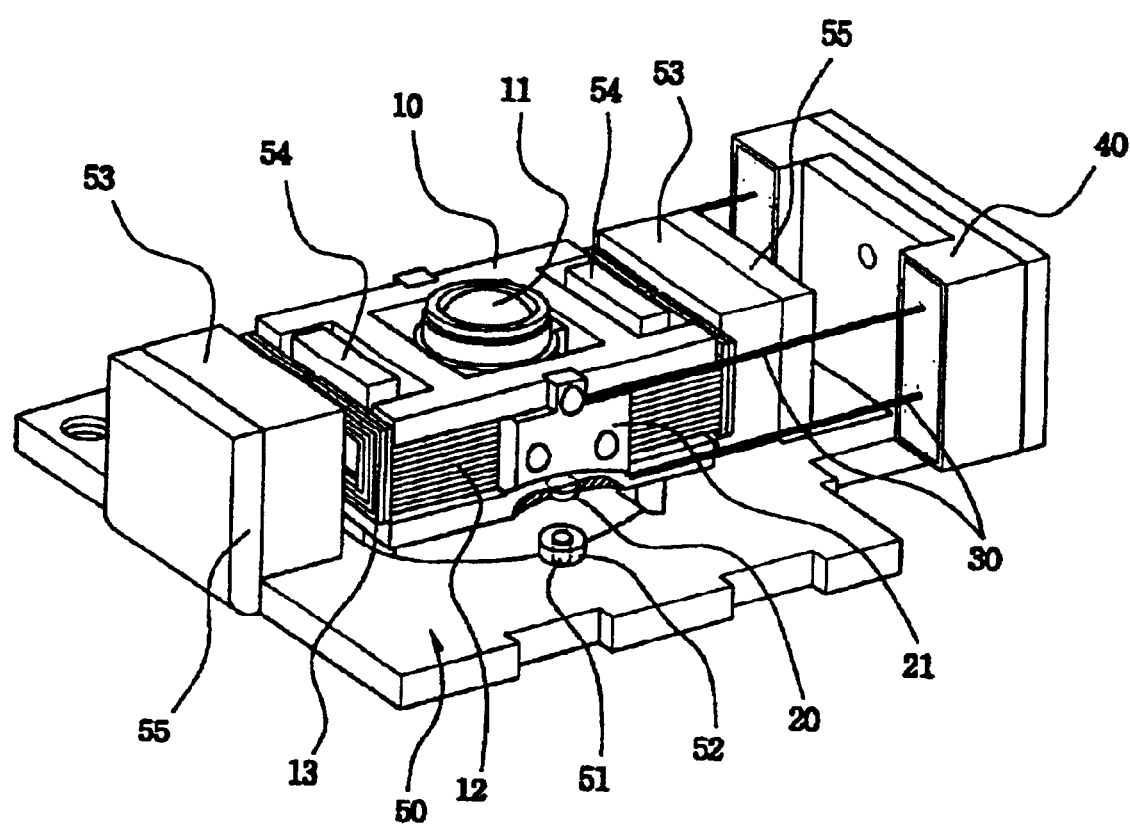
FIG. 2 is a perspective view of an optical pick-up actuator in accordance with the primary embodiment of the present invention.
Figure 3:
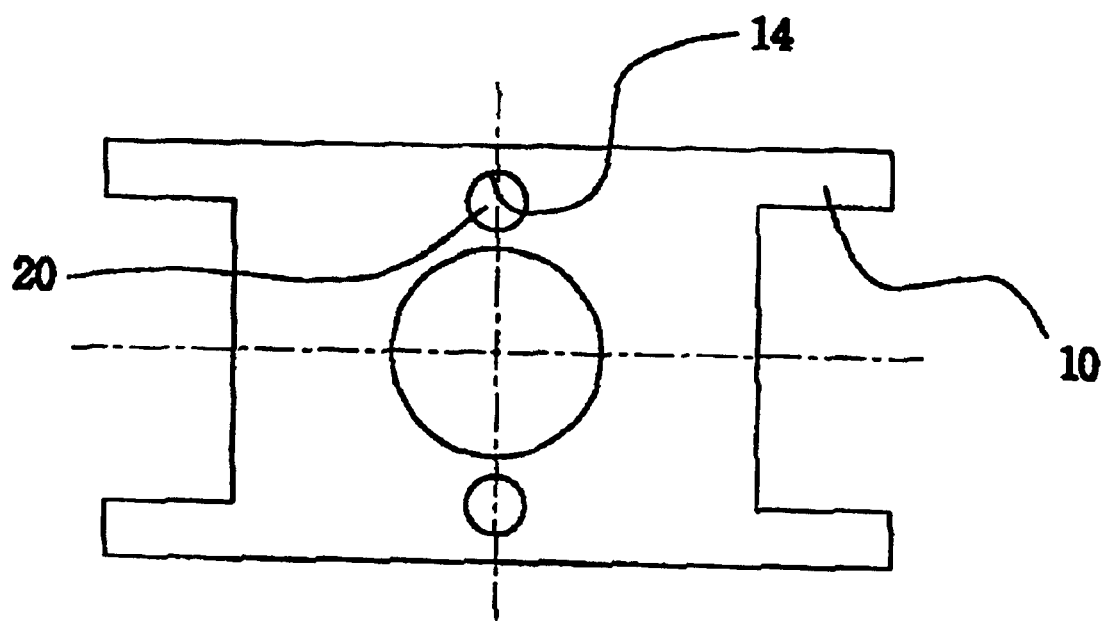
FIG. 3 is a bottom view of a blade included in the optical pick-up actuator of FIG. 2, with two tilting magnets set on the lower surface of the blade at diametrically opposite positions along the transverse central axis of the blade.

FIG. 2 is a perspective view of an optical pick-up actuator in accordance with the primary embodiment of the present invention. FIG. 3 is a bottom view of a blade included in the optical pick-up actuator of FIG. 2, with two tilting magnets set on the lower surface of the blade at diametrically opposite positions along the transverse central axis of the blade.

As shown in the drawings, the optical pick-up actuator of this invention comprises a blade 10, which has an object lens 11 at its top center for focusing light, and a drive coil unit around its outside surface.

The drive coil unit includes a focusing coil 12 and two tracking coils 13. The focusing coil 12 is wound around the outside surface of the blade 10, with two coil PCBs 21 provided at opposite sides of the focusing coil 12 at positions angularly spaced apart from the two tracking coils 13 at right angles. First ends of a plurality of suspension wires 30 hold the coil PCBs 21, and their second ends connected a wire holder 40 provided at a side of a yoke plate 50. Two sets of internal and external yokes 54 and 55 are vertically and symmetrically formed on the top surface of the yoke plate 50, and determine the range of a magnetic field formed in the blade 10 by the two types of coils 12 and 13. The yoke plate 50 also has a hole 56 at its central area aligned with the optical path of the object lens 11 of the blade 10, and so a laser beam from the lens 11 is allowed to pass through the yoke plate 50.

A drive magnet 53 is attached to the inside surface of each of the two external yokes 55 formed on the yoke plate 50, and generates a magnetic flux toward the coils 12 and 13 in response to an application of a current, thus producing electromagnetic force in the actuator to electromagnetically move the blade 10 in a vertical direction and/or a radial direction relative to the yoke plate 50. Two side yokes 51 are provided on the top surface of the yoke plate 50 at diametrically opposite positions around the laser beam passing hole 56.

A tilting coil 52 is wound around each of the two side yokes 51, and tilts the blade 10 in a desired direction relative to the yoke plate 50 as required. In such a case, electric current flows through the tilting coils 52 of the two side yokes 51. In the present invention, each of the side yokes 51 is a pin type yoke which has a predetermined length suitable for holding the tilting coil 52 and is mounted to the top surface of the yoke plate 50 through a fitting process or a welding process.

The blade 10 has two magnet seating holes 14 on its lower surface for holding two tilting magnets 20. In the primary embodiment of this invention, the two magnet seating holes 14 are formed on the lower surface of the blade 10 at positions along the transverse central axis of the blade 10 such that the two holes 14 are provided at diametrically opposite positions around the laser beam passing hole 56 of the yoke plate 50. A tilting magnet 20 is seated in each of the holes 14 such that it is aligned with an associated tilting coil 52 in a vertical direction to generate a magnetic field in cooperation with the tilting coil 52.

The tilting magnets 20 of the blade 10 and the tilting coils 52 of the side yokes 51 according to the invention are operated under the control of a solenoid.

Figure 4:
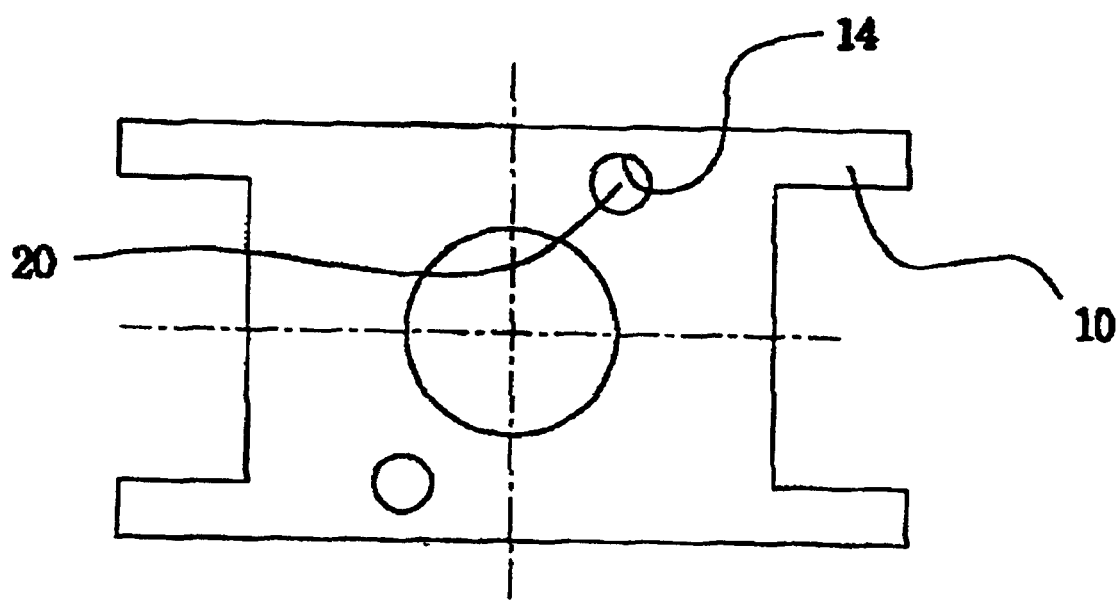
FIGS. 4 and 5 are bottom views of actuator's blades according to second and third embodiments of this invention, with the position of the two tilting magnets on the lower surface of each blade being changed in accordance with the position of two tilting coils.

FIG. 4 is a bottom view of an actuator's blade according to the second embodiment of this invention. In the second embodiment, the position of the two tilting magnets 20 on the lower surface of the blade 10 is changed in accordance with the position of the two tilting coils 52. That is, the two magnet seating holes 14 of the second embodiment are formed on the lower surface of the blade 10 at diagonally opposite positions rotated from the positions of the primary embodiment at the same angle in the same direction. In such a case, the two side yokes 51 of the yoke plate 50 for holding the two tilting coils 52 are positioned such that they are vertically aligned with the two tilting magnets 20 seated in the two holes 14. The tilting magnets 20 and the tilting coils 52 according to the second embodiment effectively tilt the blade 10 relative to the yoke plate 50 when necessary.

In the primary and second embodiments, the two tilting magnets 20 seated in the holes 14 are symmetrically positioned. However, it should be understood that the magnet seating holes 14 may be asymmetrically positioned on the blade 10.

Figure 5:
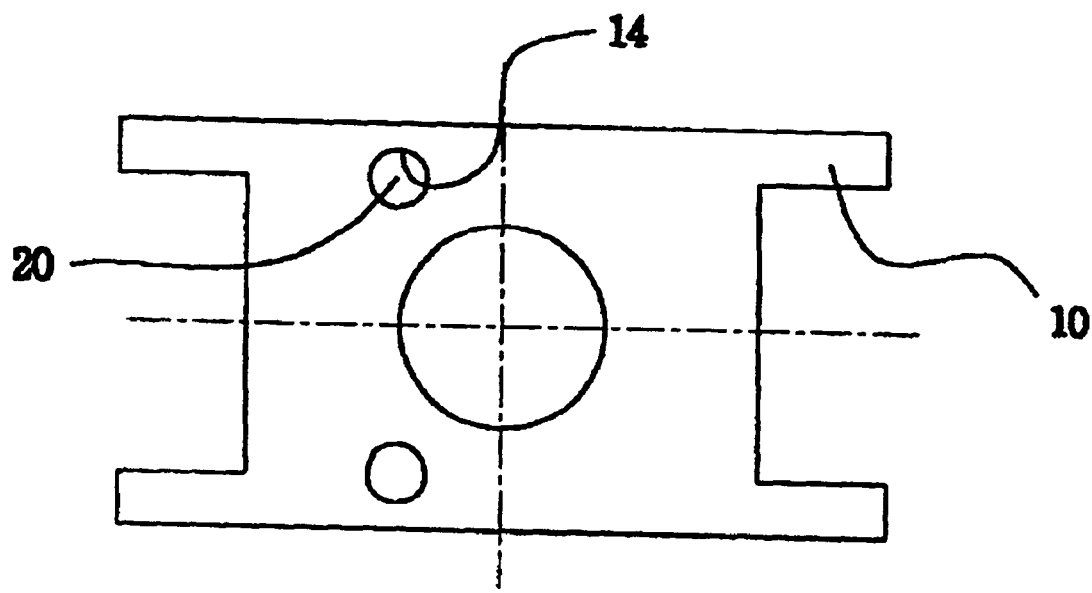

For example, in the third embodiment as shown FIG. 5, the two magnet seating holes 14 are formed on the lower surface of the blade 10 at two eccentric positions spaced equally apart from the transverse central axis of the blade 10 in the same direction.

In the pick-up actuator according to the present invention, the tilting magnets 20 of the blade 10 are spaced apart from the tilting coils 52 of the yoke plate 50 in a vertical direction by a gap of 1.5 mm~2 mm, and so the blade 10 may be tilted in either direction relative to the perpendicular optical path of the object lens 11 at a predetermined angle of θ. In the present invention, it is preferable that the tilt angle θ is set to ±0.5°.

The optical pick-up actuator of this invention may be preferably used in a CD player and, more preferably, in a DVD player.

The operational effect of the optical pick-up actuator of this invention will be described herein below.

During an operation of an optical pick-up device for reading or recording information from or onto an optical disc seated in a disc player, the optical pick-up actuator of this invention is moved within a predetermined moving range by a movement of a pick-up base (not shown) on the deck of the player, thus focusing a laser beam from a laser diode onto the recording surface of the disc and reading or recording desired information from or onto the disc. In such a case, the laser beam is precisely focused on a desired position of the disc by both an actuator's focusing operation for moving the blade in a vertical direction relative to the recording surface of the disc and an actuator's tracking operation for moving the blade in a radial direction relative to the disc. A laser beam spot having a desired size is thus precisely formed on a target position of the disc's recording surface.

In order to perform such focusing operation and tracking operation for adjusting the size and position of the laser beam spot on the disc, the two drive magnets 53 held by the two external yokes 55 of the yoke plate 50 generate magnetic fluxes toward the focusing and tracking coils 12 and 13, thus electromagnetically moving the blade 10 with the object lens 11 in the vertical direction and/or the radial direction relative to the recording surface of the disc. Such focusing operation and tracking operation of the optical pick-up actuator according to this invention remain the same as those of a conventional optical pick-up actuator used in general CD players. However, it is necessary for the pick-up actuator of this invention to perform a blade tilting operation, in addition to performing such focusing and tracking operations when the actuator is used in a DVD player for playing high density recording discs.

Figure 6:
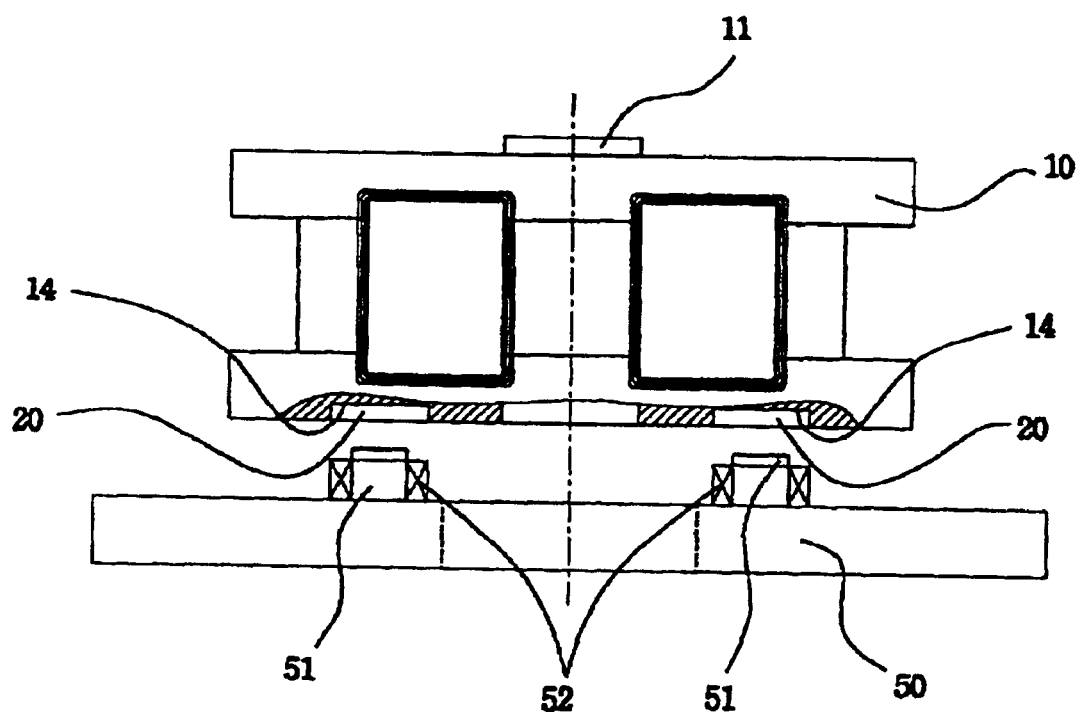
FIGS. 6 and 7 are front views, showing the operation of the optical pick-up actuator of this invention.
Figure 7:
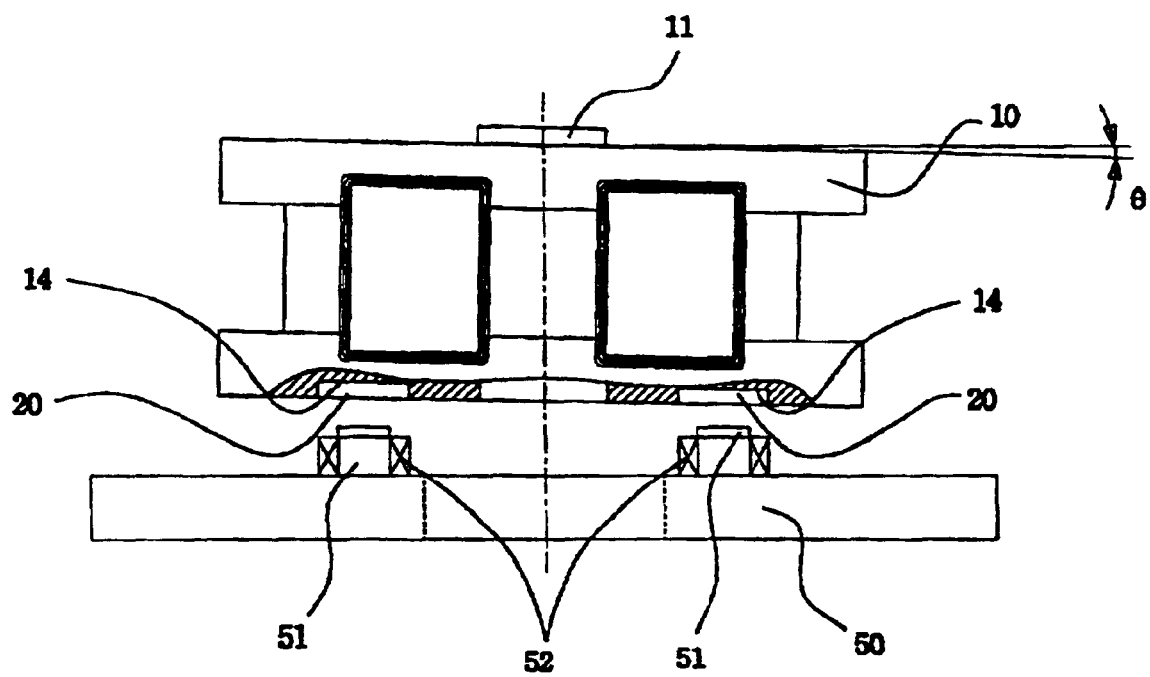

As shown in FIGS. 6 and 7, the blade tilting operation of the pick-up actuator of this invention is accomplished by the cooperation of the tilting magnets 20 with the tilting coils 52. In the optical pick-up actuator of this invention, the tilting magnets 20 are seated in the magnet seating holes 14 formed on the lower surface of the blade 10, while the tilting coils 52 are held on the side yokes 51 of the yoke plate 50.

When a current flows in the tilting coils 52 of the side yokes 51, a repulsive force or an attractive force is electromagnetically generated between one of the two magnets 20 and an associated tilting coil 52 through the right-hand law. Therefore, the blade 10 is tilted to make the optical path of the object lens 11 be perpendicular to the recording surface of the inclined disc, thus allowing the laser beam from the object lens 11 to be precisely focused on a target track of the disc and allowing the pick-up device to precisely read or record information from or onto the recording surface of the disc.

During such a blade tilting operation of the actuator, the blade 10 is tilted in either direction relative to the perpendicular optical path of the object lens 11 at a predetermined angle of θ. Such a blade tilting operation cooperates with both the focusing operation and the tracking operation of the actuator to allow the object lens 11 to precisely focus the laser beam on a target position of the disc's recording surface.

The electromagnetic blade tilting operation of the actuator is accomplished by the vertical alignment of the tilting coils 52 of the side yokes 51 with the tilting magnets 20. In the present invention, the tilting magnets 20 of the blade 10 and the tilting coils 52 of the side yokes 51 are operated under the control of a solenoid.

In the second embodiment of FIG. 4. the two magnet seating holes 14 for holding the tilting magnets 20 are formed on the lower surface of the blade 10 at diagonally opposite positions rotated from the positions of the holes 14 according to the primary embodiment of FIG. 3 by the same angle. In such a case, the two side yokes 51 of the yoke plate 50 for holding the two tilting coils 52 are positioned such that they are vertically aligned with the two tilting magnets 20 seated in the two holes 14.

Since the optical pick-up actuator of this invention performs a focusing operation, a tracking operation and a blade tilting operation, the actuator effectively controls the object lens of its blade to allow the lens to precisely focus a laser beam onto a target position of a disc, particularly, an optical DVD having a densely packed recording pits. The actuator of this invention thus minimizes an operational error of the object lens while focusing a laser beam on a disc when the disc is inclinedly positioned in a disc player. In the optical pick-up actuator of this invention, the blade 10 is positioned to float above the yoke plate 50 and has two drive magnets in addition to the focusing and tracking coils 12 and 13, thus effectively performing a focusing operation and a tracking operation in the same manner as that described for the conventional wire-driven pick-up actuators. The actuator of this invention also has two tracking magnets 20 on the blade 10, and two tracking coils 52 held on the two side yokes 51 of the yoke plate 50, thus performing a blade tilting operation which is required in the case of playing high density optical discs having densely packed recording pits, such as DVDs. The present invention also allows easy design of elements of optical pick-up actuators required to perform a blade tilting operation.

As described above, the present invention provides an optical pick-up actuator for focusing and tracking the object lens of an optical pick-up device relative to a disc while reading or writing information from or onto the disc. In the optical pick-up actuator of this invention, the blade having a focusing coil and two tracking coils has two tilting magnets, while the yoke plate has two side yokes holding two tilting coils at positions vertically aligned with the two tilting magnets. When a current flows in the tilting coils, the tilting magnets generate electromagnetic fields to tilt the blade at a desired angle relative to the perpendicular optical path of the object lens of the blade. Therefore, the actuator of this invention stably performs a blade tilting operation in addition to performing conventional focusing and tracking operations, and so the actuator allows the object lens to precisely focus a laser beam on a disc, particularly, a high density optical DVD, and allows an optical pick-up device to precisely read or write information from or onto the disc even when the disc is inclinedly positioned in the deck of a disc player. Another advantage of the actuator according to the present invention resides in that it is produced using a conventional assembling system and is managed using a conventional managing system without forcing a manufacturer or a user to purchase additional systems. In addition, the actuator of this invention is improved in its operational performance of controlling the blade, thus improving the operational performance of optical pick-up devices.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An optical pick-up actuator, comprising:
   a blade having an object lens at its top center for focusing light, said blade also having a drive coil unit around its outside surface and a plurality of magnet seating holes on opposite sides of its lower surface;
   a tilting magnet held in each of said magnet seating holes of the blade;
   a plurality of suspension wires allowing a current to flow therethrough and supporting said blade;
   a wire holder supporting one end of each of said suspension wires;
   a side yoke provided at a position vertically aligned with each of the tilting magnets held in the magnet seating holes of the blade;
   a tilting coil held on said side yoke and electromagnetically tilting the blade at a desired angle relative to a perpendicular optical path of the object lens;
   a drive magnet forming a magnetic field in the drive coil unit of the blade;
   internal and external yokes holding said drive magnet and determining a range of the magnetic field formed in the drive coil unit, said internal and external yokes being integrated into a single structure; and
   a yoke plate having a beam passing hole at its central area aligned with the optical path of said object lens, thus allowing a light beam from the object lens to pass through, said yoke plate also holding said wire holder thereon.

2. The optical pick-up actuator according to claim 1, wherein said magnet seating holes are formed on the lower surface of the blade at positions which are symmetrical around the perpendicular optical path of the object lens.

3. The optical pick-up actuator according to claim 1, wherein said magnet seating holes are formed on the lower surface of the blade at positions which are symmetrical around a tilting axis of the blade.

4. The optical pick-up actuator according to claim 1, wherein said tilting magnets of the blade and said tilting coils of the side yokes are operated under the control of a solenoid.

5. The optical pick-up actuator according to claim 1, wherein each of said side yokes is a pin type yoke which has a predetermined length and is mounted to a top surface of the yoke plate.

* * * * *